(12) United States Patent
Weiß et al.

(10) Patent No.: US 10,125,701 B2
(45) Date of Patent: Nov. 13, 2018

(54) METHOD FOR OPERATING AN INTERNAL COMBUSTION ENGINE, IN PARTICULAR A DIESEL ENGINE

(71) Applicant: MAN Truck & Bus AG, München (DE)

(72) Inventors: Joachim Weiß, Oberasbach (DE); Thomas Malischewski, Heilsbronn (DE)

(73) Assignee: MAN TRUCK & BUS AG, Munich (DE)

( * ) Notice: Subject to any disclaimer, the term of this patent is extended or adjusted under 35 U.S.C. 154(b) by 63 days.

(21) Appl. No.: 15/331,093

(22) Filed: Oct. 21, 2016

(65) Prior Publication Data

US 2017/0114734 A1     Apr. 27, 2017

(30) Foreign Application Priority Data

Oct. 22, 2015   (DE) ........................ 10 2015 013 794

(51) Int. Cl.
*F02D 41/00*   (2006.01)
*F02D 13/02*   (2006.01)
(Continued)

(52) U.S. Cl.
CPC ....... *F02D 41/005* (2013.01); *B01D 53/9431* (2013.01); *F01L 1/047* (2013.01);
(Continued)

(58) Field of Classification Search
CPC .... B01D 53/9431; F01L 1/047; F01N 3/2066; F01N 3/208; F01N 9/00; F01N 2610/02;
(Continued)

(56) References Cited

U.S. PATENT DOCUMENTS

| 6,063,350 A * | 5/2000 | Tarabulski ............. B01D 53/90 423/239.1 |
| 2006/0123788 A1 | 6/2006 | Gobert |
| 2012/0227397 A1 | 9/2012 | Willi |

FOREIGN PATENT DOCUMENTS

| EP | 2083157 A2 | 7/2009 |
| JP | 3719611 B2 | 11/2005 |

OTHER PUBLICATIONS

European Patent Office, European Search Report, dated Mar. 10, 2017, 10 pages.
(Continued)

*Primary Examiner* — Patrick Maines
*Assistant Examiner* — Dapinder Singh
(74) *Attorney, Agent, or Firm* — Lucas & Mercanti, LLP

(57) ABSTRACT

A method for operating an internal combustion engine using an external exhaust-gas recirculation device with a recirculation setting device to set the flow rate of the recirculated exhaust gas and using a closing time setting device to adjust the closing time of the at least one inlet valve of the internal combustion engine. For the reduction of nitrogen oxides emitted by the internal combustion engine, it is possible, by way of the closing time setting device, for a nitrogen oxide reduction cycle to be set in which the at least one inlet valve of the internal combustion engine closes earlier or later than in the basic cycle. If the torque of the internal combustion engine falls below at least a defined torque threshold value, the internal combustion engine is operated in the basic cycle and the recirculation of the exhaust gas is enabled by way of the recirculation setting device, and wherein, if the torque of the internal combustion engine exceeds the defined torque threshold value, the internal combustion engine is operated (Continued)

in the nitrogen oxide reduction cycle and the recirculation of the exhaust gas is blocked by way of the recirculation setting device.

20 Claims, 3 Drawing Sheets

(51) Int. Cl.
    *F02D 41/24*     (2006.01)
    *F02D 41/14*     (2006.01)
    *F01N 3/20*     (2006.01)
    *F01L 1/047*     (2006.01)
    *F02M 26/08*     (2016.01)
    *F02B 29/04*     (2006.01)
    *B01D 53/94*     (2006.01)
    *F02B 37/013*     (2006.01)

(52) U.S. Cl.
    CPC ............ *F01N 3/2066* (2013.01); *F02B 29/04* (2013.01); *F02B 37/013* (2013.01); *F02D 13/0234* (2013.01); *F02D 13/0269* (2013.01); *F02D 41/0007* (2013.01); *F02D 41/009* (2013.01); *F02D 41/0077* (2013.01); *F02D 41/1446* (2013.01); *F02D 41/1497* (2013.01); *F02D 41/2406* (2013.01); *F02M 26/08* (2016.02); *F01N 2610/02* (2013.01); *F02D 2041/001* (2013.01); *F02D 2200/101* (2013.01); *F02D 2200/1002* (2013.01)

(58) Field of Classification Search
    CPC ......... F01N 2900/1404; F01N 2900/08; F02B 29/04; F02B 37/013; F02B 37/004; F02D 13/0234; F02D 13/0269; F02D 41/0007; F02D 41/0047; F02D 41/005; F02D 41/0077; F02D 41/009; F02D 41/1446; F02D 41/1461; F02D 41/1497; F02D 41/2406; F02M 26/02; F02M 26/08; Y02T 10/142; Y02T 10/144; Y02T 10/146; Y02T 10/24; Y02T 10/47
    USPC ................................. 60/287, 288, 602, 605.2
    See application file for complete search history.

(56) References Cited

OTHER PUBLICATIONS

Lancefield, Tim, The Application of Variable Event Valve Timing to a Modern Diesel Engine, Society of Automotive Engineers, Inc., Technical Papers Series, Mar. 6, 2000, 14 pages.

* cited by examiner

METHOD FOR OPERATING AN INTERNAL COMBUSTION ENGINE, IN PARTICULAR A DIESEL ENGINE

CROSS-REFERENCE TO RELATED APPLICATIONS

The present application claims priority of DE 10 2015 013 794.8, filed Oct. 22, 2015, which is incorporated herein by reference.

BACKGROUND OF THE INVENTION

The invention relates to a method for operating an internal combustion engine, in particular a diesel engine, an apparatus for carrying out the method, and a vehicle, in particular a utility vehicle, for carrying out the method and/or having the apparatus.

It is known to provide an external exhaust-gas recirculation device on an internal combustion engine, so that exhaust gas emitted by the internal combustion engine can be fed back to the internal combustion engine. In this way, pollutants, in particular nitrogen oxides, contained in the exhaust gas of the internal combustion engine can be reduced.

It is also generally known that, to increase the efficiency of the internal combustion engine and to realize a corresponding lowering of the fuel consumption of the internal combustion engine, the combustion air fed to the internal combustion engine can be compressed by a compressor of an exhaust-gas turbocharger. Here, a particularly effective increase in efficiency can be realized by two-stage supercharging with intercooling. The compression of the combustion air however normally leads to an increase of the peak temperatures in the combustion process, whereby the amount of nitrogen oxides emitted by the internal combustion engine is also increased.

Furthermore, owing to the compression of the combustion air, at high torques or high mean pressures of the internal combustion engine, external exhaust-gas recirculation is impeded owing to the high pressure of the combustion air flowing through the intake tract and a simultaneously increasing positive scavenging gradient. Measures for increasing the recirculation rate reduce the effectiveness of the process recirculation and, owing to the increased fuel consumption, lead to a further increase of the emitted nitrogen oxides. To nevertheless be able to comply with applicable exhaust-gas regulations, it would for example be possible, in the case of an SCR catalytic converter being used, for the amount of an aqueous urea solution ("AdBlue") introduced into the exhaust tract upstream of the SCR catalytic converter to be increased. This however entails increased operating costs and, if the internal combustion engine is provided in a vehicle, a reduction of the range of the vehicle.

BRIEF SUMMARY OF THE INVENTION

It is therefore an object of the invention to provide a method for operating an internal combustion engine, in particular a diesel engine, and an apparatus by which the internal combustion engine can be operated with high efficiency and the pollutant emissions of the internal combustion engine can be reduced in an effective manner.

According to an embodiment of the present invention, a method for operating an internal combustion engine, in particular a diesel engine, is proposed, the internal combustion engine being part of an apparatus leaving an external exhaust-gas recirculation device to feed back exhaust gas emitted by the internal combustion engine to the internal combustion engine again, wherein the exhaust-gas recirculation device has a recirculation setting device by which the flow rate of the recirculated exhaust gas can be set. The apparatus also includes a closing time setting device configured to adjust the closing time of the at least one inlet valve of the internal combustion engine, wherein, by the closing time setting device, a basic cycle of the internal combustion engine can be set in which the at least one inlet valve of the internal combustion engine closes in a crank angle range from 1° to 40° crank angle, in particular from 10° to 40° crank angle, after BDC (bottom dead centre). According to the invention, for the reduction of the nitrogen oxides emitted by the internal combustion engine, it is possible, by the closing time setting device, for a nitrogen oxide reduction cycle to be set in which the at least one inlet valve of the internal combustion engine closes earlier or later than in the basic cycle, wherein a control unit is provided by which the closing time setting device and the recirculation setting device are regulated and/or controlled as a function of the present torque of the internal combustion engine, wherein, if the torque of the internal combustion engine falls below at least a defined torque threshold value, the internal combustion engine is operated in the basic cycle and the recirculation of the exhaust gas is enabled by the recirculation setting device, and wherein, if the torque of the internal combustion engine exceeds the defined torque threshold value, the internal combustion engine is operated in the nitrogen oxide reduction cycle and the recirculation of the exhaust gas is blocked by the recirculation setting device.

In this way, the pollutants emitted by the internal combustion engine can be reduced in an effective manner, because, at relatively high torques or at relatively high mean pressures, the internal combustion engine is now operated in the nitrogen oxide reduction cycle, and the exhaust-gas recirculation is blocked. As a result of the operation of the internal combustion engine in the nitrogen oxide reduction cycle, the peak temperature in the combustion process is lowered, such that the amount of nitrogen oxides formed in the combustion process is reduced. Furthermore, in the nitrogen oxide reduction cycle, a high level of efficiency of the internal combustion engine is also achieved. The recirculation of the exhaust gas emitted by the internal combustion engine is in this case blocked because the recirculation has an adverse effect on the nitrogen oxide reduction cycle (inter alia owing to a reduced scavenging gradient) and, as already mentioned, at relatively high torques or relatively high mean pressures of the internal combustion engine, recirculation is less effective with regard to the process control. At relatively low torques or at relatively low mean pressures of the internal combustion engine, the internal combustion engine is then operated in the basic cycle, and the recirculation of the exhaust gas is enabled. With this mode of operation of the internal combustion engine, the exhaust-gas recirculation device exhibits a high level of effectiveness with regard to the reduction of the emitted nitrogen oxides. Furthermore, the internal combustion engine is operated in the basic cycle with a particularly high level of efficiency.

The present torque of the internal combustion engine may in this case be determined for example by the control unit from the injected fuel quantity. The injected fuel quantity is in this case normally proportional to the actuation duration of the injection.

In a preferred embodiment, the torque threshold value is set and/or adjusted by the control unit as a function of the present engine speed of the internal combustion engine. The engine speed of the internal combustion engine has an influence on the exhaust-gas flow rate that can be recirculated by the external exhaust-gas recirculation device. Here, it is preferably provided that the set torque threshold value decreases with increasing engine speed of the internal combustion engine.

The torque threshold value preferably lies in a range from 20% to 60% of the maximum torque of the internal combustion engine.

In a preferred specific refinement, in the control unit, there is stored a characteristic map in which the torque threshold value is recorded as a function of the engine speed of the internal combustion engine. By a characteristic map of said type, the torque threshold value can be set in a simple and reliable manner as a function of the engine speed of the internal combustion engine.

It is particularly preferable for an exhaust tract having an exhaust-gas aftertreatment system to be provided, wherein a temperature detection device is provided by which the temperature of the exhaust gas flowing through the exhaust tract can be detected upstream of the exhaust-gas aftertreatment system as viewed in the exhaust-gas flow direction, and wherein the closing time setting device and the recirculation setting device are regulated and/or controlled not only as a function of the torque but also as a function of the temperature detected by the temperature detection device. In this way, a high level of effectiveness of the exhaust-gas aftertreatment system can be ensured. The detection of the exhaust-gas temperature may in this case be performed for example by a temperature sensor arranged upstream of the exhaust-gas aftertreatment system.

Furthermore, the expression "exhaust tract" is explicitly to be understood here in a broad sense. Accordingly, the exhaust tract in this case encompasses all exhaust-gas-conducting regions and components.

In a preferred embodiment of the method, if the temperature detected by the temperature detection device exceeds at least a temperature threshold value and the torque of the internal combustion engine exceeds the defined torque threshold value, the internal combustion engine is operated in the basic cycle and/or the recirculation of the exhaust gas is enabled by the recirculation setting device. If the temperature detected by the temperature detection device falls below the at least one defined temperature threshold value and the torque of the internal combustion engine exceeds the defined torque threshold value, the internal combustion engine can then be operated in the nitrogen oxide reduction cycle and the recirculation of the exhaust gas can be blocked by the recirculation setting device. In this way, it can be reliably ensured that the exhaust-gas aftertreatment system is not subject to excessive heating during operation of the internal combustion engine in the nitrogen oxide reduction cycle.

The temperature threshold value preferably lies in a temperature range from 450° C. to 500° C. In this way, damage to an SCR catalytic converter, which has vanadium as SCR-catalytically active material, is effectively counteracted. If other materials are used, the temperature threshold values must be adapted correspondingly.

Furthermore, in the range of very low torques, it is possible for a switch to be made to the nitrogen oxide reduction cycle in order to increase the exhaust-gas temperature in order to improve the effectiveness of the exhaust-gas aftertreatment system. This effect arises owing to the throttling action of the nitrogen oxide reduction cycle with simultaneously low compression pressures in the low-load range.

It is furthermore preferably the case that, for the exhaust-gas recirculation, at least some of the exhaust gas flowing through an exhaust tract is introduced into a recirculation line of the external exhaust-gas recirculation device upstream of a turbine of at least one exhaust-gas turbocharger of the internal combustion engine as viewed in the exhaust-gas flow direction.

It is furthermore preferably provided that the exhaust gas tha ecirculated by the external exhaust-gas recirculation device is introduced into an intake tract of the internal combustion engine downstream of a compressor of at least one exhaust-gas turbocharger of the internal combustion engine as viewed in the combustion-airflow direction. In this way, sooting of the air-conducting system parts is counteracted. Alternatively and/or in addition, the exhaust gas recirculated by the external recirculation device may be introduced into an intake tract of the internal combustion engine upstream of a compressor of at least one exhaust-gas turbocharger of the internal combustion engine as viewed in the combustion-air flow direction.

In a further preferred embodiment, an exhaust tract having an exhaust-gas aftertreatment system is provided, wherein the exhaust-gas aftertreatment system has at least one SCR catalytic converter element by which nitrogen oxides contained in the exhaust gas of the internal combustion engine can be reduced using ammonia as reducing agent, wherein a feed device is provided by which the ammonia, in particular in the form of an aqueous urea solution, is introduced into the exhaust tract upstream of the SCR catalytic converter element. By such a system, the nitrogen oxides contained in the exhaust gas can be reduced in an effective manner. Here, in the nitrogen oxide reduction cycle, the nitrogen oxides contained in the exhaust gas can be reduced in a particularly effective manner by the SCR catalytic converter element, because it is normally the case that relatively high exhaust-gas temperatures prevail here. The conversion of the nitrogen oxides contained in the exhaust gas using the introduced ammonia is considerably improved in this way.

In a preferred embodiment, the nitrogen oxide reduction cycle is formed by a Miller cycle. Here, it is preferably provided that, in the nitrogen oxide reduction cycle, the at least one inlet valve of the internal combustion engine closes in a crank angle range from 40° to 5° crank angle, in particular 40° to 1° crank angle, before BDC. With such a crank angle range, the formation of nitrogen oxides in the combustion process of the internal combustion engine is reliably counteracted, and at the same time, a high level of efficiency of the internal combustion engine is realized.

Alternatively and/or in addition, the nitrogen oxide reduction cycle may also be formed by an Atkinson cycle. Here, it is preferably provided that, in the nitrogen oxide reduction cycle, the at least one inlet valve of the internal combustion engine is closed in a crank angle range from 50° to 90° crank angle, in particular from 50° to 70° crank angle, after BDC.

In a specific embodiment, the closing time setting device may be formed by a cam adjustment means and/or by a camshaft adjustment means. In this way, the closing time of the at least one inlet valve of the internal combustion engine can be adjusted in a straightforward and reliable manner.

The internal combustion engine preferably has multiple, in particular two, exhaust-gas turbochargers for the compression of the combustion air flowing through an intake tract of the internal combustion engine, in order to ensure a high level of compression of the combustion air flowing through the intake tract. Here, it is preferably provided that in each case at least one cooling device for cooling the compressed combustion air is arranged in or on the intake tract between a compressor of a first exhaust-gas turbocharger and a compressor of a second exhaust-gas turbocharger, and downstream of the compressor of the second exhaust-gas turbocharger, as viewed in the combustion-air flow direction. A high level of efficiency of the internal combustion engine is ensured in this way.

The object of the invention is also met by an apparatus having an internal combustion engine, in particular having a diesel engine, and having an external exhaust-gas recirculation device configured to feed back the exhaust gas emitted by the internal combustion engine to the internal combustion engine again, wherein the exhaust-gas recirculation device has a recirculation setting device by which the flow rate of the recirculated exhaust gas can be set, wherein a closing time setting device is provided by which the closing time of the at least one inlet valve of the internal combustion engine can be adjusted, wherein, by the closing time setting device, a basic cycle of the internal combustion engine can be set in which the at least one inlet valve of the internal combustion engine closes in a crank angle range from 1° to 40° crank angle, in particular from 10° to 40° crank angle, after BDC (bottom dead centre). According to the invention, for the reduction of the nitrogen oxides emitted by the internal combustion engine, it is possible, by the closing time setting device, for a nitrogen oxide reduction cycle to be set in which the at least one inlet valve of the internal combustion engine closes earlier or later than in the basic cycle, wherein a control unit is provided by which the closing time setting device and the recirculation setting device can be regulated and/or controlled as a function of the torque of the internal combustion engine, wherein, if the torque of the internal combustion engine falls below at least a defined torque threshold value, the internal combustion engine is operated in the basic cycle and the recirculation of the exhaust gas is enabled by the recirculation setting device, and wherein, if the torque of the internal combustion engine exceeds the defined torque threshold value, the internal combustion engine is operated in the nitrogen oxide reduction cycle and the recirculation of the exhaust gas is blocked by the recirculation setting device.

The advantages obtained by the apparatus according to the invention are identical to the advantages, already discussed above, of the method implementation according to the invention, such that said advantages will not be repeated at this juncture.

A vehicle, in particular a utility vehicle, for carrying out the method according to the invention and/or having the apparatus according to the invention is also claimed. The advantages obtained by said vehicle are likewise identical to the advantages, already discussed above, of the method according to the invention, and will likewise not be repeated here. As an alternative to a vehicle, the apparatus according to the invention may self-evidently also be provided in a static or positionally fixed arrangement.

The advantageous embodiments and/or refinements of the invention as discussed above and/or presented in the subclaims may—other than for example in situations where there are clear dependencies or non-combinable alternatives—be used individually or else in any desired combination with one another.

BRIEF DESCRIPTION OF THE DRAWINGS

The invention and its advantageous embodiments and/or refinements, and the advantages thereof, will be discussed in more detail below, merely by an example, on the basis of drawings, in which.

DETAILED DESCRIPTION OF THE PREFERRED EMBODIMENTS

Figure 1:
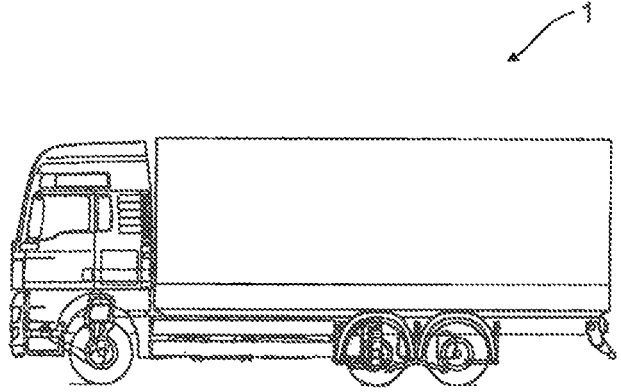
FIG. 1 shows, in a side view, a heavy goods vehicle having the apparatus according to the invention.
Figure 2:
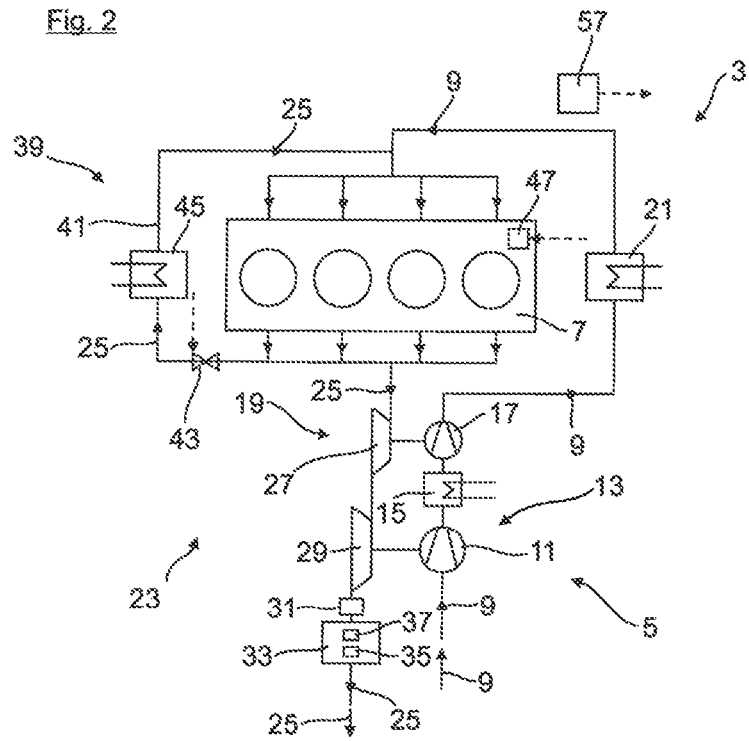
FIG. 2 is a schematic diagram of an apparatus according to an embodiment of the invention.

FIG. 1 shows a vehicle 1, which in this case is, by example, in the form of a heavy goods vehicle, with an apparatus 3 according to the invention (FIG. 2). The construction of the device 3 will be discussed in more detail below on the basis of FIG. 2:

As shown in FIG. 2, the apparatus 3 has an intake tract 5 by which combustion air 9 can be fed to an internal combustion engine 7 of the apparatus 3. Here, by example, the intake tract 5 has, as viewed in an exhaust-gas flow direction, a compressor 11 of a first exhaust-gas turbocharger 13, a heat-dissipating heat exchanger 15, a compressor 17 of a second exhaust-gas turbocharger 19, and a further heat-dissipating heat exchanger 21.

By the compressor 11, the combustion air 9 flowing into the intake tract 5 is compressed. Subsequently, the combustion air that has been compressed by the compressor 11 is cooled by the heat-dissipating heat exchanger 15. The heat-dissipating heat exchanger 15 may be formed, for example, by a charge-air cooler. Finally, the combustion air is compressed yet further by the compressor 17 and is cooled again by the heat-dissipating heat exchanger 21. The heat-dissipating heat exchanger 21 may likewise be formed by a charge-air cooler.

According to FIG. 2, the apparatus 3 furthermore also has an exhaust tract 23 through which the exhaust gas 25 emitted by the internal combustion engine 7 is conducted. Here, by example, the exhaust tract 23 has, as viewed in the exhaust-gas flow direction, a turbine 27 of the second exhaust-gas turbocharger 19, a turbine 29 of the first exhaust-gas turbocharger 13, a temperature sensor 31 and a merely schematically indicated exhaust-gas aftertreatment system 33. Here, by example, the exhaust-gas aftertreatment system 33 has an SCR catalytic converter element 35, by which nitrogen oxides contained in the exhaust gas 9 of the internal combustion engine 7 can be reduced using ammonia as reducing agent. It is also the case here that the exhaust-gas aftertreatment system 33 has a feed device 37 by which the reducing agent, in this case for example in the form of an aqueous urea solution, can be introduced into the exhaust tract 23 upstream of the SCR catalytic converter element 35.

Furthermore, the exhaust tract 23 also has an external exhaust-gas recirculation device 39, by which the exhaust gas 9 emitted by the internal combustion engine 7 can be fed to the internal combustion engine 7 again. Here, by example, for the exhaust-gas recirculation, the exhaust gas 25 emitted by the internal combustion engine 7 is introduced, upstream of the turbine 27, into a recirculation line 41 of the exhaust-gas recirculation device 39, via which recirculation line the exhaust gas 25 can be introduced into the intake tract 5 downstream of the heat-dissipating heat exchanger 21 as viewed in a combustion-air flow direction. The exhaust-gas recirculation device 39 furthermore also has a recirculation setting device which, in this case, is for example in the form of a straight-way valve 43 and by which the flow rate of the recirculated exhaust gas 25 can be set. Here, by example, the exhaust-gas recirculation device 39 furthermore also has a heat-dissipating heat exchanger 45 by which the recirculated exhaust gas 25 is cooled. Here, by example, the heat-dissipating heat exchanger 45 is arranged in the recirculation line 41 downstream of the straight-way valve 43 as viewed in the exhaust-gas flow direction.

As per FIG. 2, the apparatus 3 furthermore also has a closing time setting device 47 by which the closing time of the inlet valves of the internal combustion engine 7 can be adjusted. Here, by example, the closing time setting device 47 is formed by a camshaft adjustment device. By the closing time setting device 47, a basic cycle of the internal combustion engine 7 can be set, in which the inlet valves of the internal combustion engine 7 are closed in a crank angle range from 10° to 40° crank angle after BDC (bottom dead centre). Furthermore, by the closing time setting device 47, it is also possible for a nitrogen oxide reduction cycle to be set, in which the inlet valves of the internal combustion engine 7 are closed earlier or later than in the basic cycle. Here, by example, the nitrogen oxide reduction cycle is formed by a Miller cycle. Here, the inlet valves of the internal combustion engine 7 are preferably closed, in the Miller cycle, in a crank angle range from 40° to 5° crank angle before BDC, As an alternative to the Miller cycle, it would for example also be possible for the nitrogen oxide reduction cycle to be formed by an Atkinson cycle.

Figure 3:
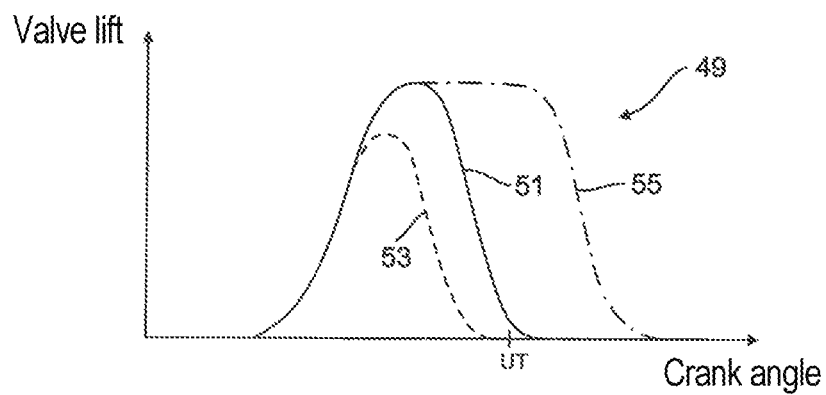
FIG. 3 is a diagram shov ing various value lift cycles.
Figure 4:
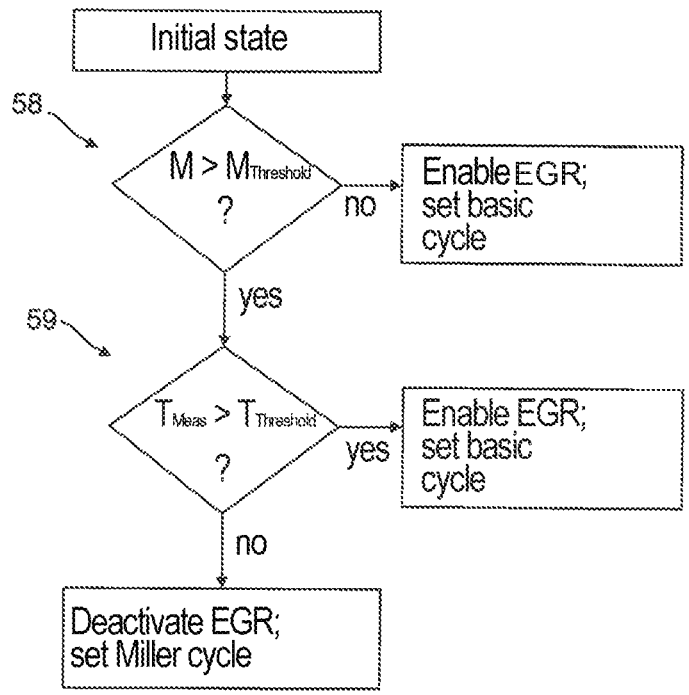
FIG. 4 is a flow diagram showing a method according to an embodiment of the invention.

FIG. 3 shows a diagram 49 which is intended to illustrate the differences between the basic cycle, the Miller cycle and the Atkinson cycle. In the diagram 49 there is plotted a first curve 51, which shows an exemplary valve lift of the inlet valves of the internal combustion engine 7 as a function of the crank angle of the internal combustion engine 7 in the case of the basic cycle. Also plotted in the diagram 49 is a curve 53 which shows an exemplary valve lift of the inlet valves as a function of the crank angle of the internal combustion engine 7 in the case of a Miller process. Also plotted in the diagram 49 is a curve 55 which shows an exemplary valve lift of the inlet valves as a function of the crank angle of the internal combustion engine 7 in the case of an Atkinson cycle.

As per FIG. 2, the apparatus 3 furthermore also has a control unit 57 by which the closing time setting device 47 and the straight-way valve 43 are regulated and/or controlled, in this case as a function of the present torque of the internal combustion engine 7 and as a function of the temperature measured by the temperature sensor 31. Said regulation or control will be discussed in more detail below on the basis of FIG. 6:

Proceeding from an initial state in which, in this case, by example, the exhaust-gas recirculation is enabled by the straight-way valve 43 and in the basic cycle of the internal combustion engine 7 is set, it is firstly checked, by the control unit 57, in a step 58, whether the present torque M or the present mean pressure of the internal combustion engine 7 is higher than a defined torque threshold value $M_{Threshold}$. If the present torque M of the internal combustion engine 7 is not higher than the defined torque threshold value $M_{Threshold}$, the exhaust-gas recirculation remains enabled and the basic cycle remains set. If the present torque M of the internal combustion engine 7 is higher than the defined torque threshold value $M_{Threshold}$, then it is checked, in a step 59, whether the temperature $T_{meas}$ measured by the temperature sensor 31 is higher than a defined temperature threshold value $T_{Threshold}$. If the measured temperature $T_{meas}$ is higher than the temperature threshold value $T_{Threshold}$, it is for example the case here that the recirculation of the exhaust gas 9 remains enabled and the internal combustion engine continues to be operated in the basic cycle. If the measured temperature $T_{meas}$ is not higher than the temperature threshold value, the exhaust-gas recirculation is blocked by the straight-way valve 43 and the Miller cycle is set, or the internal combustion engine 7 is operated in the Miller cycle.

Figure 5:
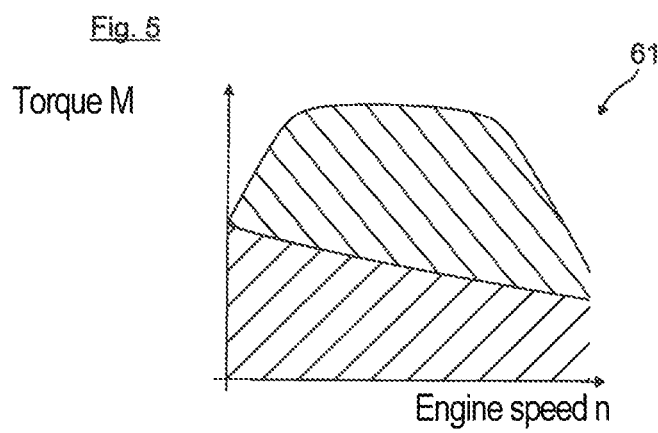
FIG. 5 is a diagram showing a characteristic map according to an embodiment of the present invention.

It is also the case here, by example, that the torque threshold value $M_{Threshold}$ is adjusted or changed by the control unit 57 as a function of the engine speed n of the internal combustion engine 7. Said adjustment is performed by a characteristic map 61 which is stored in the control unit 57 (FIG. 5). It is preferably also the case that, in addition to the present torque M of the internal combustion engine 5 and the temperature $T_{meas}$ measured by the temperature sensor 31, the ambient temperature and/or the ambient pressure are/is also taken into consideration in the regulation and/or control of the closing time setting device 47 and of the straight-way valve 43.

LIST OF REFERENCE DESIGNATIONS

1 Vehicle
3 Apparatus
5 Intake tract
7 Internal combustion engine
9 Combustion air
11 Compressor
13 First exhaust-gas turbocharger
15 Heat-dissipating heat exchanger
17 Compressor
19 Second exhaust-gas turbocharger
21 Heat-dissipating heat exchanger
23 Exhaust tract
25 Exhaust gas
27 Turbine
29 Turbine
31 Temperature sensor
33 Exhaust-gas aftertreatment system
35 SCR catalytic converter element
37 Feed device
39 Exhaust-gas recirculation device
41 Recirculation line
43 Straight-way valve
45 Heat-dissipating heat exchanger
47 Closing time setting device
49 Diagram
51 Curve
53 Curve
55 Curve
57 Control unit
58 Step
59 Step
61 Characteristic map
M Torque
$M_{Threshold}$ Torque threshold value
n Engine speed
$T_{Threshold}$ Temperature threshold value
$T_{Meas}$ Temperature measurement value

The invention claimed is:

1. A method for operating an internal combustion engine, wherein the internal combustion engine includes at least one inlet valve, the internal combustion engine being part of an apparatus further including an external exhaust-gas recirculation device configured to feed exhaust gas emitted by the internal combustion engine back to the internal combustion engine, the exhaust-gas recirculation device having a recirculation setting device configured to set the flow rate of the recirculated exhaust gas, and a valve closing time adjuster for at least one inlet valve of the internal combustion engine, the valve closing time adjuster being configured to set a basic cycle of the internal combustion engine in which the at least one inlet valve of the internal combustion engine closes in a crank angle range from 1° to 40° crank angle after BDC (bottom dead center), wherein, for the reduction of the nitrogen oxides emitted by the internal combustion engine, the valve closing time adjuster is configured to set a nitrogen oxide reduction cycle in which the at least one inlet valve of the internal combustion engine closes earlier or later than in the basic cycle, the method comprising the steps of:
controlling, by a control unit of the internal combustion engine, the valve closing time adjuster and the recirculation setting device as a function of the torque of the internal combustion engine;
if the torque (M) of the internal combustion engine falls below at least a defined torque threshold value ($M_{Threshold}$), operating the internal combustion engine in the basic cycle and enabling the recirculation of the exhaust gas by the recirculation setting device; and
if the torque (M) of the internal combustion engine exceeds the defined torque threshold value ($M_{Threshold}$), operating the internal combustion engine in the nitrogen oxide reduction cycle and blocking the recirculation of the exhaust gas by the recirculation setting device.

2. The method according to claim 1, wherein the internal combustion engine is a diesel engine.

3. The method according to claim 1, wherein the at least one inlet valve of the internal combustion engine doses in a crank angle range from 10° to 40° crank angle after BDC in the basic cycle.

4. The method according to claim 1, further comprising the step of setting the torque threshold value ($M_{Threshold}$) by the control unit as a function of an engine speed (n) of the internal combustion engine.

5. The method according to claim 4, wherein the set torque threshold value ($M_{Threshold}$) decreases with increasing engine speed of the internal combustion engine.

6. The method according to claim 4, further comprising the step of storing, in the control unit, a characteristic map which records the torque threshold value ($M_{Threshold}$) as a function of the engine speed (n) of the internal combustion engine.

7. The method according to claim 1, wherein the torque threshold value ($M_{Threshold}$) lies in a range from 10% to 60% of a maximum torque of the internal combustion engine.

8. The method according to claim 1, wherein the apparatus further comprises an exhaust tract with an exhaust-gas aftertreatment system and a temperature detection device so that a temperature ($T_{meas}$) of the exhaust gas flowing through the exhaust tract is detected upstream of the exhaust-gas aftertreatment system as viewed in the exhaust-gas flow direction, and the step of controlling further includes controlling the valve closing time adjuster and the recirculation setting device additionally as a function of the temperature ($T_{meas}$) detected by the temperature detection device.

9. The method according to claim 8, wherein, if the temperature ($T_{meas}$) exceeds at least a defined temperature threshold value ($T_{Threshold}$) and the torque (M) of the internal combustion engine exceeds the defined torque threshold value($M_{Threshold}$), then at least one of the internal combustion engine is operated in the basic cycle and the recirculation of the exhaust gas is enabled by the recirculation setting device, and if the temperature ($T_{meas}$) falls below the at least one defined temperature threshold value ($T_{Threshold}$) and the torque (M) of the internal combustion engine exceeds the defined torque threshold value ($M_{Threshold}$), then the internal combustion engine is operated in the nitrogen oxide reduction cycle and the recirculation of the exhaust gas is blocked by the recirculation setting device.

10. The method according to claim 9, wherein the temperature threshold value ($T_{Threshold}$) lies in a temperature range from 450° C. to 500° C.

11. The method according to claim 8, wherein the apparatus further includes at least one exhaust-gas turbocharger, the method comprising at least one of:
introducing at least some of the exhaust gas flowing through the exhaust tract into a recirculation line of the external exhaust-gas recirculation device upstream of a compressor of at least one exhaust-gas turbocharger as viewed in the exhaust-gas flow direction, or
introducing the exhaust gas that is recirculated by the external exhaust-gas recirculation device into an intake tract of the internal combustion engine upstream of a turbine of at least one exhaust-gas turbocharger as viewed in the combustion-air flow direction.

12. The method according to claim 1, wherein the apparatus further includes an exhaust tract having an exhaust-gas aftertreatment system with at least one SCR catalytic converter element configured to reduce nitrogen oxides contained in the exhaust gas using ammonia as reducing agent, wherein the method includes introducing, by a feed device, the ammonia into the exhaust tract upstream of the SCR catalytic converter element as viewed in the exhaust-gas flow direction.

13. The method according to claim 1, wherein the nitrogen oxide reduction cycle is a Miller cycle, and in the nitrogen oxide reduction cycle the at least one inlet valve of the internal combustion engine closes in a crank angle range from 40° to 5° crank angle before BDC.

14. The method according to claim 1, wherein the nitrogen oxide reduction cycle is an Atkinson cycle, and in the nitrogen oxide reduction cycle the at least one inlet valve of the internal combustion engine closes in a crank angle range from 50° to 70° crank angle after BDC.

15. The method according to claim 1, wherein the valve closing time adjuster adjusts the closing time by cam adjustment or camshaft adjustment.

16. The method according to claim 1, wherein the internal combustion engine includes a first exhaust-gas turbocharger and a second exhaust-gas turbocharger for the compression of the combustion air flowing through an intake tract of the internal combustion engine, the method further comprising cooling the compressed combustion air by a cooling device arranged in the intake tract between a compressor of the first exhaust-gas turbocharger and a compressor of the second exhaust-gas turbocharger, and by another cooling device arranged in the intake tract downstream of the compressor of the second exhaust-gas turbocharger, as viewed in the combustion-air flow direction.

17. An apparatus comprising:
an internal combustion engine having at least one inlet valve;

an external exhaust-gas recirculation device configured to feed exhaust gas emitted by the internal combustion engine back to the internal combustion engine, the exhaust-gas recirculation device having a recirculation setting device configured to set the flow rate of the recirculated exhaust gas;

a valve closing time adjuster for the at least one inlet valve of the internal combustion engine, wherein the valve closing time adjuster is configured to set a basic cycle of the internal combustion engine in which the at least one inlet valve of the internal combustion engine closes in a crank angle range from 1° to 40° crank angle after BDC (bottom dead center), and for the reduction of the nitrogen oxides emitted by the internal combustion engine, the valve closing time adjuster is configured to set a nitrogen oxide reduction cycle in which the at least one inlet valve of the internal combustion engine closes earlier or later than in the basic cycle;

a control unit at least one of controlling or regulating the valve closing time adjuster and the recirculation setting device as a function of a torque of the internal combustion engine, wherein, if the torque (M) of the internal combustion engine falls below at least a defined torque threshold value ($M_{threshold}$), the internal combustion engine is operated in the basic cycle and the recirculation of the exhaust gas is enabled by the recirculation setting device, and if the torque (M) of the internal combustion engine exceeds the defined torque threshold value ($M_{threshold}$), the internal combustion engine is operated in the nitrogen oxide reduction cycle and the recirculation of the exhaust gas is blocked by the recirculation setting device.

18. The apparatus according to claim 17, wherein the internal combustion engine is a diesel engine.

19. The apparatus according to claim 17, wherein the at least one inlet valve of the internal combustion engine closes in a crank angle range from 10° to 40° crank angle after BDC in the basic cycle.

20. A vehicle having an apparatus according to claim 17.